June 25, 1935. J. G. THOMAS 2,005,812
METHOD AND APPARATUS FOR TREATING SLIMY MATERIALS
Original Filed May 12, 1931
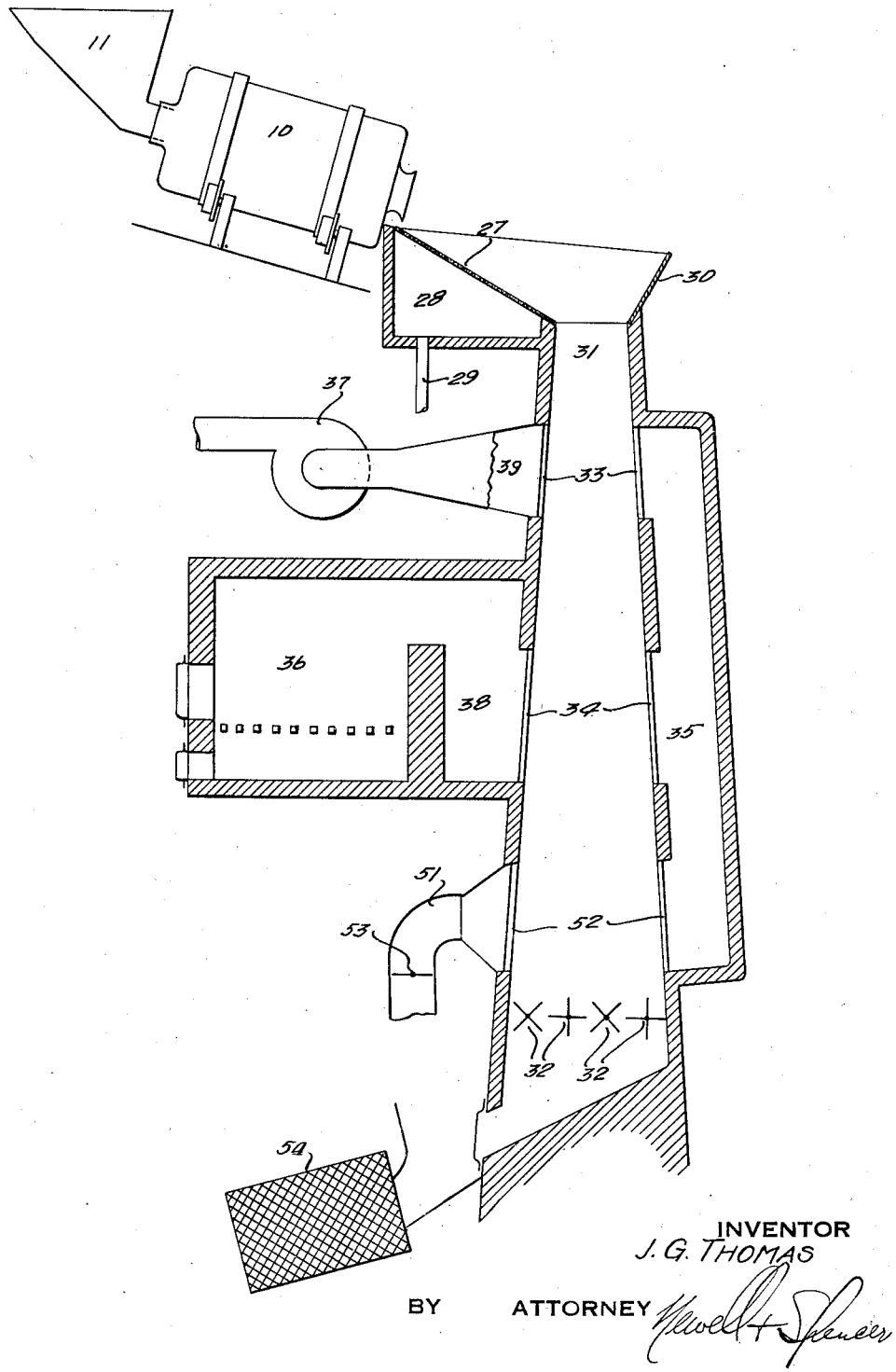
INVENTOR
J. G. THOMAS
BY ATTORNEY Patented June 25, 1935

2,005,812

UNITED STATES PATENT OFFICE 2,005,812

METHOD AND APPARATUS FOR TREATING SLIMY MATERIALS

John Gordon Thomas, New York, N. Y.

Application May 12, 1931, Serial No. 536,704
Renewed February 2, 1935

15 Claims. (Cl. 110—8)

This invention relates to a method and apparatus for treating more or less finely divided matter with relatively high content of evaporable liquid, and particularly adapted for the treatment of sewage sludge and other wastes, e. g., industrial wastes from paper mills, packing houses, tanneries, etc. More particularly, the invention relates to a method and apparatus for treatment of such materials by means of a current of hot gas while the material is held open to the passage of the gas by a carrier.

It has been proposed, prior to my invention, to burn sewage sludge and other wet wastes, but so far as I am aware, such suggestions have not proved practical or economical, chiefly because the nature of the material is such that it does not satisfactorily permit of passage of air through a mass of the material, so as to support combustion, and also because the water content of sludge is so great and so difficult of removal that the cost with methods heretofore employed of evaporating the water to a point at which combustion can take place is excessive, and because the obnoxious odors may prevent the operation of such processes near inhabited districts.

Prior to my invention it has been proposed to deposit sewage sludge upon surfaces of a carrier material having mechanical strength and a refractory nature adapted to withstand handling and heat treatment without losing its form. According to such process, a substantial part of the water may be drained from the sludge because of the nature of the carrier material upon which it is deposited, and the material may thereafter be subjected to a heat treatment to effect thermal decomposition of the organic matter of the sludge.

I have now found that by depositing the sludge upon relatively large pieces of carrier material and allowing the supernatent liquid to drain from the mixture, that drying and subsequent combustion may be economically effected. I have discovered that it is possible to pass a blast of hot gases, e. g., combustion gases, through such a mixture and thereby to effect rapid and controlled heat treatment, e. g., combustion, of the sludge material upon the carrier material without production of serious odor nuisance.

I have further found that if the oxygen-containing gases are pre-heated, e. g., in a furnace, by mixing with hot products of combustion, and are subsequently passed through a dried mixture of sludge material and carrier material, that the sludge material may be burned to any desired extent, and that the burning may be so complete as to utilize substantially all of the combustible material of the mixture. The heat resulting from this combustion of sludge material, as well as heat supplied to the gases in the pre-heater, may be utilized by forcing the gases which result from the combustion step through another part of the mixture which preferably has been drained, but has not yet been dried. The result of this treatment is to carry off from the sludge material water and volatile constituents the latter of which may, if their value justifies the cost, be recovered from the resulting gases by subsequent treatment. The drying step serves also to remove from the gases ash, dry sludge, or other solid particles which have become entrained in the gases and to cool the gases to a point at which they can be satisfactorily treated for removal of odors before discharging into the atmosphere.

In the accompanying drawing, I have illustrated a preferred form of my invention. This is shown merely as one example of an apparatus embodying the invention, and in which the method of my invention may be carried out.

The figure of the drawing illustrates diagrammatically and partly in vertical section a sludge treating unit embodying my invention.

In the figure, I have indicated by the reference character 10 a mixing device similar to an ordinary concrete mixer, into which sludge and a carrier material such as broken slag, crushed rock, etc., are fed from the hopper 11. The mixer may be operated continuously, in which case it is of substantial length, so that the sludge and the carrier are thoroughly mixed during their passage from the feed end to the discharge end, or it may be a batch mixer, in which a charge of sludge and carrier may be tumbled together until thoroughly mixed, and then entirely dumped before a new charge is introduced. In either case, the discharge from the mixer 10 may pass over the screen 27 above the drainage chamber 28. During the passage of the mixture over the screen 27, the supernatant liquid drains through into the chamber 28, and thence through the pipe 29 to waste or to a sewage treatment works, or any suitable device for clarifying this effluent.

Many other types of mixers may be used, and it is to be understood that it is not essential that the sludge and carrier be agitated together.

Although I have referred herein particularly to sewage sludge, it will be understood that my invention is applicable to other materials, and particularly to finely divided wet matter. By "finely divided", I mean material in such state of division that of itself it would tend to become too greatly compacted to permit satisfactory drainage and access of air or other gases for drying, combustion, etc. By the use of my invention, the carrier forms a supporting structure in which the interstices are only partially filled with the finely divided matter, and through which, therefore, drainage and circulation of gas may readily take place.

In some cases, and particularly with sewage sludge, the sludge is recovered in a substantially liquid condition, in which it tends to drain through the interstices of the carrier material. It may, therefore, frequently be desirable to concentrate the sludge, e. g., by means of filter presses, and particularly continuous filters, or by the addition of a coagulent, before mixing it with or otherwise distributing it upon the carrier material. In such case, the water content may be reduced, for example, as low as 75 or 80 per cent. before mixing with the carrier material and a corresponding saving in the fuel required for evaporation can thereby be effected. Or a coagulant may be added to the mixture to precipitate the sludge on the carrier.

The liquid which drains through the screen 27 is drawn off, e. g., through the pipe 29.

From the hopper 30, a mixture of carrier material and sludge drops by gravity through the open stack 31. In the present instance, this stack is shown as increasing in diameter slightly from top to bottom. This serves to avoid jamming of the material in its passage through the stack, and also provides for a shorter passage of the gases in the drying zone, where the voids are still partially filled with water of the sludge, than in the combustion zone, where the voids are more open to the passage of the gas, because the water of the sludge has been evaporated.

The downward flow of the material may be regulated by a rotary discharge valve or grate 32, or by other desired means.

At 33 and at 34, the walls of the stack are formed of grates which provide for the passage of a blast of gas transversely through the material in the stack. The lower of these grates 34 is connected through a passage 35 with a furnace 36. This furnace may be heated by coal, oil, gas or any suitable fuel, including dried sludge or carbon residue produced in the process and oils, tars, etc., if such are distilled from the material in the drying zone and recovered in condensers, etc. This furnace is advantageously supplied with an excess of air sufficient to support the combustion of the organic matter of the sludge in the stack 31.

The gases from the furnace 36, containing sufficient air to support combustion and at a temperature regulated to maintain an ignition temperature in the material adjacent the grates 34, are drawn by the blower 37 from a furnace 36 through the passage 38 and from thence through the grates 34 and the mixture of carrier material and dried sludge within the stack 31. Heat from the combustion of the sludge material in this portion of the stack is added to the heat given to the gases by the pre-heating, and the gases carrying this combined heat, somewhat diminished by loss to the carrier material and sludge, are conducted through the passage way 35 to the grates 33 and therethrough into the moist sludge and carrier mixture near the top of the stack 31. The effect of these hot gases passing through the moist mixture is to carry off as vapor the water and lighter volatile constituents of the sludge.

The gases cooled by this drying operation and carrying the volatile constituents of the sludge are drawn through the pasage 39 to the blower 37, and from thence pass to condensers, electrical precipitators, scrubbers, spray tower, or other apparatus, highly diluted with spent combustion gases from the fuel and sludge, for separation and/or recovery of the volatile and/or objectionable constituents of these gases.

The hot carrier material with ash and/or residual carbon deposited upon its surface is advantageously cooled before being discharged from the stack 31. In the present instance, I have illustrated a grate 52 through which cold air is drawn from the valve controlled passage 51. This air is pre-heated by the ash and carrier material and may pass up into the burning zone within the grates 34, or may pass through the grates 52 and thence to the passageway 35, where it will serve as secondary air for combustion of combustible gases which may pass from the burning zone into the passageway 35. The stream of cold air from the passage 51 serves to cool the material to some extent before and during its discharge.

The carrier material, as it is discharged from the stack 31, ordinarily will be coated with powdery sludge, with ash or with residual carbon, or with two or all, and inasmuch as these, particularly dried sludge, may have value for fertilizer, or other purpose, and the carrier material may be reused in the process, it may be advantageous to treat the material, e. g., by tumbling the material together to knock off the adherent ash or carbon, and screening to separate the finely divided material. In the drawing I have shown a rotary screen 54 for this purpose. After this treatment, or before, if it is desired to retain the adherent carbon or ash on the carrier material, it may be returned to the mixing drum 10, where more sludge may be distributed onto it and the process repeated.

The fine carbon residue thus obtained may for example be utilized in the deposition of sludge from sewage, or other liquid containing suspended solids. This carbon, in particular, may assist in settling of finely divided suspended solids, e. g., by being mixed with the sewage during a chemical coagulation.

The combustion step may be regulated, e. g., by temperature control or by control of the amount of oxygen admitted during the combustion step, so as to be carried only to the point at which the odoriferous volatile constituents are destroyed and the residue may be removed from the carrier material and utilized and/or sold for other purposes, e. g., for fertilizer, or as fuel in the preheating furnace. Such incomplete combustion of the sludge may be effected, for example, by diluting the combustion gases in the furnace 36 with an excess of secondary air, so that the temperature of the gases passing into the material between the grates 34 will be sufficient to burn only the more readily combustible portions of the sludge or other material, and will leave a substantial residue unburned. In this case, additional heat may be added in the passage 35, so as to provide combustion of any unburned gases which may have come from the combustion zone 34, and to provide additional heat which may be required in the drying zone 33.

Although I have shown above a preferred embodiment of my invention, I do not wish to imply in any way that the invention is limited to such an apparatus, or to the process described in connection therewith. On the contrary, many changes may be made without departing from the scope of my invention. Thus, the sludge, or other slimy material may be deposited upon the carrier in other ways, e. g., by direct settling or precipitation from sewage or other liquids into the carrier; or the sludge, etc., may be obtained in reasonably concentrated form by the activated sludge process now in common use, by settling, or screening, or by any other process, and may be pumped or carried on conveyors or dredges into the mixer 10, or may be mixed with or deposited on the carrier material in any other way.

Similarly, instead of a vertical calciner 31, I may use a horizontal calciner, e. g., one in which the material is carried upon a traveling grate, or moved over a stationary grate by any suitable means. In some cases, also, the gases from the combustion zone may pass to the drying zone through the calciner, and even through the material itself, in which case there may be no well defined distinction between the combustion and the drying zones. Thus, for example, with a rotary calciner, such as those used in the treatment of waste liquors in the paper industry, or cement kilns, the moist material may be conveyed into one end and the hot gases supplied to the opposite end, so that the combustion zone in one end merges gradually into the drying zone. Such rotary kilns are particularly suitable for the process. However, the vertical arrangement provides for more efficient heat transfer and control.

I have found it preferable not to bring the flame by which the combustion gases are preheated into direct contact with the sludge material, and particularly to avoid bringing the flame into direct contact with the moist sludge material. By regulating the temperature of the gases and avoiding direct contact of the flame with the organic matter, I am able to effect a uniform combustion, and substantially to avoid the production of objectionable odors, and also more efficiently to utilize the heat value of the gases.

The pre-heating of the air to the ignition temperature of the sludge material is of advantage also because it provides for the burning of gases and vapors as soon as they are produced, and also because it insures the burning of the sludge material even if it is blown off from the carrier and entrained in the gas stream, although with the arrangement shown, unburned or burned sludge entrained in the air will be caught in the wet sludge in the drying zone.

The size of the pieces of carrier material which may be chosen for use in my invention may vary. The pieces should be large enough to permit free flow of water therebetween during the drainage, and free passage of air therebetween during the drying and combustion. If the pieces are too small, there may be capillary effects which interfere with drainage and/or the resistance to passage of air will render the drying and/or combustion difficult, and may also result in objectionable bubbling and foaming of the sludge on the carrier material during the drying and/or calcining. Beyond this, an excessive increase in size results in loss of economy of space in the apparatus, both because of the larger voids and because of reduction of the area of the carrying surface, requiring a greater volume of the carrier material. Experience has indicated that pieces varying in size from about 1 to about 2 inches in diameter are best adapted for the purposes of this invention, and preferably the pieces used at any one time are of fairly uniform size. Thus, broken slag or other furnace residues which are held on a 1 inch screen, but which pass a 2 inch screen, will make a very satisfactory carrier material.

The number of materials which may be used as carrier material is large. In general, a material having a rough or porous surface is superior to one having a glassy surface. Advantageously, the material should be able to stand repeated handling and repeated subjection to the combustion temperature without objectionable deterioration. I have found that slag, preferably a porous slag, such as honeycomb slag, are best adapted for this purpose. I am aware, however, that many other materials, and particularly refractory materials such as broken brick, silicate minerals, and many others may be used in my invention.

What I claim is:

1. The method of disposal of wet sewage sludge and like matter which comprises distributing such matter onto the surface of pieces of carrier material sufficiently large to leave open interstices for free flow of gases between them when piled together with the wet matter distributed thereon, drying said matter thereon, and subjecting the dried matter on said carrier pieces to at least partial combustion by passing through a pile thereof oxygen-containing gases at a temperature above the ignition temperature of said dried matter.

2. The method as defined in claim 1, in which the drying step comprises recirculating gases from the combustion treatment through a pile of the wet matter on carrier pieces.

3. The method as defined in claim 1, in which combustion is substantially complete.

4. The method as defined in claim 1, in which the carrier is a non-inflammable substance capable of withstanding a plurality of combustion treatments without objectionable change, and after combustion of matter carried thereon, the carrier material is reused by depositing additional wet matter thereon.

5. The method of disposal of wet sewage sludge and like matter which comprises distributing such matter onto the surfaces of pieces of carrier material sufficiently large to leave open interstices for free flow of gases between them when piled together with the wet matter distributed thereon, moving the wet material together with the carrier material through a stream of drying gases until substantially dried, and thereafter moving said dried material on the carrier material into a stream of oxidizing gases pre-heated to a temperature sufficient to effect substantial oxidization of combustible compounds thereof.

6. The method as defined in claim 5, in which the gases from the oxidizing step, carrying heat of oxidation therefrom, are passed directly to the drying and forced through the wet material.

7. The method as defined in claim 1, in which the carrier material is slag.

8. The method of treating sewage sludge, which comprises distributing it onto the surfaces of pieces of carrier material sufficiently large to permit free flow of gases between them when piled together with said sludge distributed thereon, drying said sludge thereon, heating the dried sludge to the ignition temperature of organic matter thereof and subjecting the dried organic matter on said carrier pieces to at least partial combustion by passing oxygen-containing gases through a pile thereof while said organic matter is at a temperature sufficiently high to cause ignition, and heating said oxygen-containing gases to a temperature adapted to insure combustion of combustible gases given off from the organic matter in the combustion zone.

9. An apparatus adapted for disposal of wet sewage sludge and like matter, which comprises a mass of carrier pieces large enough to permit free flow of gases through the interstices between said pieces, and adapted to carry a substantial thickness of the wet matter upon their surfaces, means for coating said pieces with wet matter, a calciner adapted to receive said carrier pieces with said matter thereon, and having a drying zone and a combustion zone, and means for causing a current of drying gases to pass through the interstices between the carrier pieces in the drying zone and a current of oxidizing gases to pass through the interstices between the carrier pieces in the combustion zone.

10. An apparatus as defined in claim 9, which further includes a means adjacent the oxidizing zone, adapted to pre-heat the oxidizing gases.

11. An apparatus as defined in claim 9, which includes a conduit from the oxidizing zone to the drying zone, adapted to re-circulate hot products of combustion through the material in the drying zone.

12. An apparatus as defined in claim 9, in which the drying zone and the combustion zone are in the same vertical stack, the combustion zone being beneath the drying zone, and the combination further includes means for feeding the carrier pieces through the stack.

13. An apparatus as defined in claim 9, in which the drying zone and the combustion zone are in the same vertical stack, the drying zone being above the combustion zone, and connected thereto by a conduit external to the stack for conducting gases from the combustion zone to the drying zone.

14. An apparatus adapted for treating sewage sludge and like materials, which comprises a mass of carrier pieces large enough to leave open interstices when a layer of substantial thickness of the sludge has been deposited upon each piece so as to permit rapid draining of the liquid, and free flow of gases through the interstices between the pieces, means for distributing the wet sludge upon the carrier pieces, means for draining excess liquid from the sludge, means for drying the sludge by passing a current of heated gases between the interstices between said pieces, and means for effecting at least partial combustion of the sludge by passing a current of heated oxygen-containing gases through the interstices between said carrier pieces after drying of said sludge.

15. The method as defined in claim 1, in which hot gases from the combustion step are mixed with additional gases at lower temperatures to provide hot drying gases at a temperature below the scorching temperature of the sludge, and said gases are thereupon used in the drying step.

JOHN GORDON THOMAS.